United States Patent [19]

Larsen et al.

[11] E Re. 29,951

[45] Reissued Apr. 3, 1979

[54] BIGHT STOP MECHANISM FOR SEWING MACHINES

[75] Inventors: Robert H. Larsen, Middletown; Philip F. Minalga, Piscataway, both of N.J.

[73] Assignee: The Singer Company, New York, N.Y.

[21] Appl. No.: 893,556

[22] Filed: Apr. 5, 1978

Related U.S. Patent Documents

Reissue of:

[64] Patent No.: 4,055,130
Issued: Oct. 25, 1977
Appl. No.: 658,641
Filed: Feb. 17, 1976

[51] Int. Cl.[2] ..... D05B 3/02; D05B 1/08

[52] U.S. Cl. ..... 112/158 E; 112/163

[58] Field of Search ..... 112/158 E, 158 R, 157, 112/221, 222, 226, 163-167; 318/571

[56] References Cited

U.S. PATENT DOCUMENTS

| | | | |
|---|---|---|---|
| 3,296,987 | 1/1967 | Kawaguchi | 112/158 R |
| 3,412,700 | 11/1968 | Marforio | 112/158 R |
| 3,568,072 | 3/1971 | Rosener | 318/571 X |
| 3,696,768 | 10/1972 | Torii | 112/158 R |
| 3,872,808 | 3/1975 | Wurst | 112/158 E |
| 4,048,932 | 9/1977 | Odermann et al. | 112/158 E |

*Primary Examiner*—Peter Nerbun
*Attorney, Agent, or Firm*—Robert E. Smith; Edward L. Bell; William V. Ebs

[57] ABSTRACT

The present disclosure relates to zig-zag sewing machines including means for controlling the bight stops in order to produce ornamental patterns. In particular, the disclosure relates to electronically controlled sewing machines having storage means for storing stitch information and wherein logic means are used to select and release stitch information in timed relation with the operation of the sewing machine. The disclosure of the invention has particular application in those sewing situations wherein it is desired to use more than one needle in a single needle holder of the needle bar which therefore necessitates a limitation on the magnitude of the jogging or swinging of the needle bar in order to accommodate the multiple needles in the aperture of the needle plate. In accordance with the disclosure of the present invention whenever more than one needle is used in the sewing machine the electronic control of the bight stops is automatically put into effect whenever such multiple needle mode is selected.

7 Claims, 3 Drawing Figures

BIGHT STOP MECHANISM FOR SEWING MACHINES

Matter enclosed in heavy brackets [ ] appears in the original patent but forms no part of this reissue specification; matter printed in italics indicates the additions made by reissue.

BACKGROUND OF THE INVENTION

In sewing machines it is desirable in some sewing situations to be able to use more than one needle as in the case, for example, of multicolored embroidery stitching. When substituting two or more needles for a single needle in a zig-zag machine, it becomes necessary to limit the swing amplitude of the needles, or the bight stops, as the two or more needles would swing in a wider path than a single needle which could take the needles out of the area covered by the aperture in the needle plate resulting in a breaking of the needles during penetration of the fabric. It is known to limit the bight stops in mechanically controlled zig-zag machines when substituting multiple needles for single needles, such as for example shown in U.S. Pat. No. 3,296,987 granted Jan. 10, 1967. In such mechanically controlled machines the zig-zag motion is generally imparted to the needle bar by a cam mechanism which is connected to the needle bar mechanism through a cam follower and associated linkage. In order to adjust or limit the bight stops in such machines means are generally provided for altering the linkage between the cam mechanism and the needle bar mechanism.

In electronically controlled sewing machines of the type disclosed in co-pending U.S. patent application Ser. No. 431,649 *(now patent #3,984,745)* filed on Jan. 8, 1974, cam mechanisms of the type mentioned above are completely eliminated and logic means are used to select and release stitch information stored in a memory means in timed relation with the operation of the sewing machine. Digital information from the memory means is converted to positional analog signals which control closed loop servo means including moving coil linear actuators directly controlling the position of conventional stitch forming instrumentalities such as the zig-zag mechanism for the needle bar. Therefore it will be seen that in machines of this type means other than those which have been provided heretofore must be used for limiting the bight stops. What is required in order to limit the bight stops in an electronically controlled machine is means for limiting the positional analog signals which control the closed loop servo means to thereby provide a signal to said servo means which is reduced in proportion to the reduction in swing amplitude or bight required for the situation wherein multiple needles or the like are used.

SUMMARY OF THE INVENTION

As briefly mentioned above, a machine of the type disclosed in this invention is controlled by electronic means including logic means which select and release stitch information from a stored memory in timed relation with the operation of the sewing machine and in accordance with a pattern selected by the operator. The signal from the memory is presented in digital form and is converted in a digital-to-analog converter and through suitable amplification is fed to a moving coil linear actuator which directly controls the position of the needle bar mechanism. A feedback circuit is also provided which senses the position of the linear actuator in accordance with time and location and modifies the input signal so that the actuator will accurately assume the position as called for by the original information released from the memory.

U.S. patent application Ser. No. 596,683 *(now patent #4,016,821)* filed July 16, 1975 discloses a means for overriding the analog signal provided by the digital-to-analog converter for both feed and bight pattern information thereby providing a variable control of said signal to the linear actuator. Such a system is desirable for modifying the pattern information, as for example, to obtain an optimum button hole that would have a balanced appearance. However, it has been found that in situations where multiple needle use can be optionally selected on the machine, fixed bight stop limits should be provided so as to prevent any possibility of needle breakage or the like. In accordance with the present invention circuit means are provided which, when selectively operational, impose a fixed limit on the analog signal at the output of the digital-to-analog converter. Such fixed limit is imposed prior to input to the linear actuator and also prior to the operation of any override controls, as described above, so that there is no danger in the operator modifying the signal with the override control to cause the needles to swing a greater amplitude than is desired.

Accordingly, it is one object of the invention to provide a novel and improved bight stop mechanism for a sewing machine.

It is another object of the invention to provide a novel and improved bight stop mechanism for an electronically controlled sewing machine.

It is a further object of the invention to provide a novel and improved bight stop mechanism for limiting the swing amplitude of the needle bar in a zig-zag sewing machine when a multiple needle mode is selected.

Other objects and advantages of the invention will be best understood when reading the following description with the accompanying drawings as identified below.

DESCRIPTION OF THE INVENTION

Figure 1:
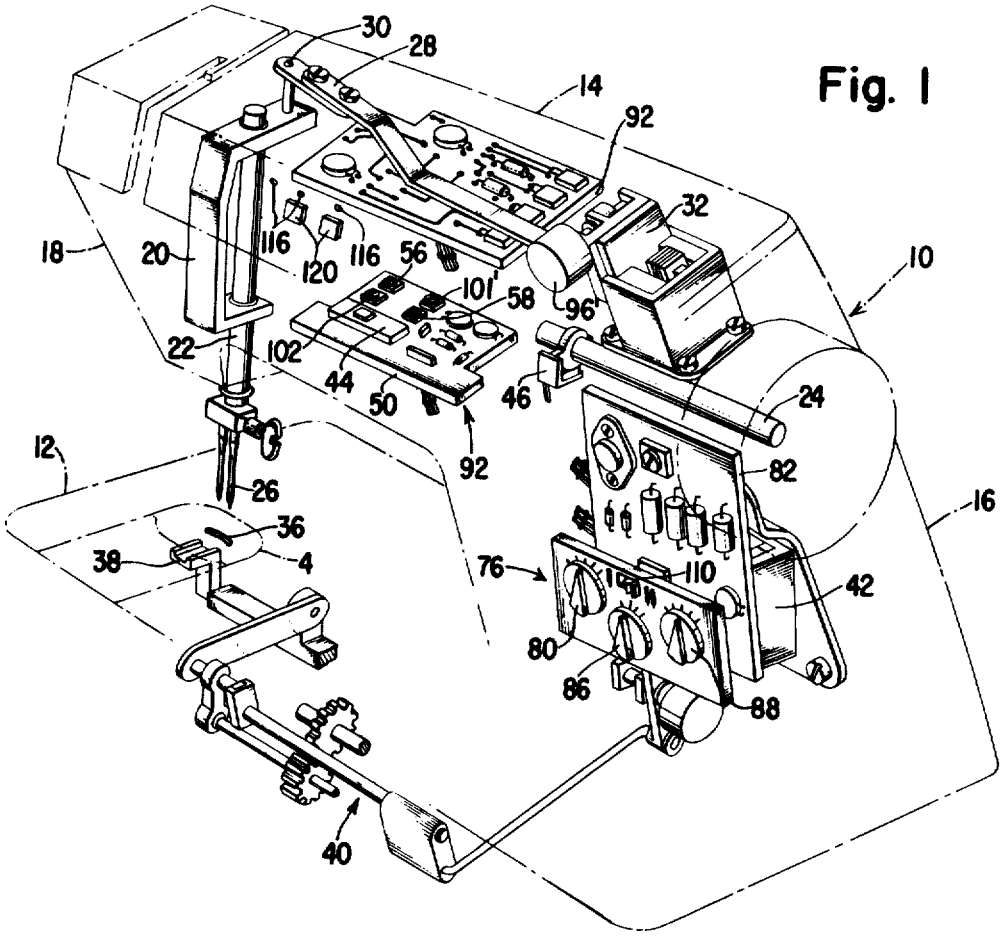
FIG. 1 is a perspective view of a sewing machine showing fragmented portions of the sewing instrumentalities and control mechanisms necessary to illustrate the physical elements of the invention.

Referring to the drawings there is illustrated in FIG. 1, a sewing machine, partially in phantom, including a frame 10 having a bed 12 and a bracket arm 14 supported in an overhanging relationship to the bed by a standard 16. The free end of the bracket arm 14 includes a head portion 18 in which is supported a needle bar gate 20 which in turn supports a needle bar 22 for reciprocating motion in an endwise direction in the usual manner as found in sewing machines. Endwise reciprocating motion is imparted to the needle bar 22 through suitable connection with an arm shaft 24 driven in the conventional manner as by an electric motor or the like (not shown). A single needle or a plurality of needles 26, as illustrated are supported in the lower extremity of the needle bar 22 and are disposed for cooperation beneath the bed 12 with suitable sewing instrumentalities such as a looper (not shown) or the like.

As is known in zig-zag sewing machines, the needle bar gate 22 is operatively associated with actuating mechanism for imparting lateral jogging motion to the needle bar 22, which, as illustrated in FIG. 1, includes a drive arm 28 pivotally connected to the needle bar gate as illustrated at 30. The drive arm 28 is operably connected to a reversible linear motor or actuator 32 for imparting a linear motion to the drive arm 28 and as a result jogging motion to the needle bar gate 20 through the pivot connection 30. Reference may be made to U.S. patent application Ser. No. 431,649 filed on Jan. 8, 1974 and assigned to the same assignee as the present invention for a more detailed description of the linear actuator. Disposed within the bed 12 and below the needle bar 22 for operation in association therewith is a needle plate 34 which includes an aperture 36 having a width sufficient to at least accommodate a single needle during maximum width zig-zag motion. Supported beneath the bed plate 12 is a feed mechanism for feeding the work across the surface of the bed plate and includes a feed dog 38 operably connected with suitable linkage generally indicated at 40 which in turn is connected to a second linear motor or actuator 42. As described in co-pending application Ser. No. 596,683 filed July 16, 1975 and assigned to the same assignee as the present invention, the feed mechanism is also electronically controlled so that electronic signals are fed to the linear actuator 42 to position the feed mechanism for the desired forward or reverse feed in accordance with a selected pattern. The feed mechanism itself forms no part of the present invention and for purposes of the present invention other suitable feed mechanisms may be incorporated herein.

Figures 2, 3:
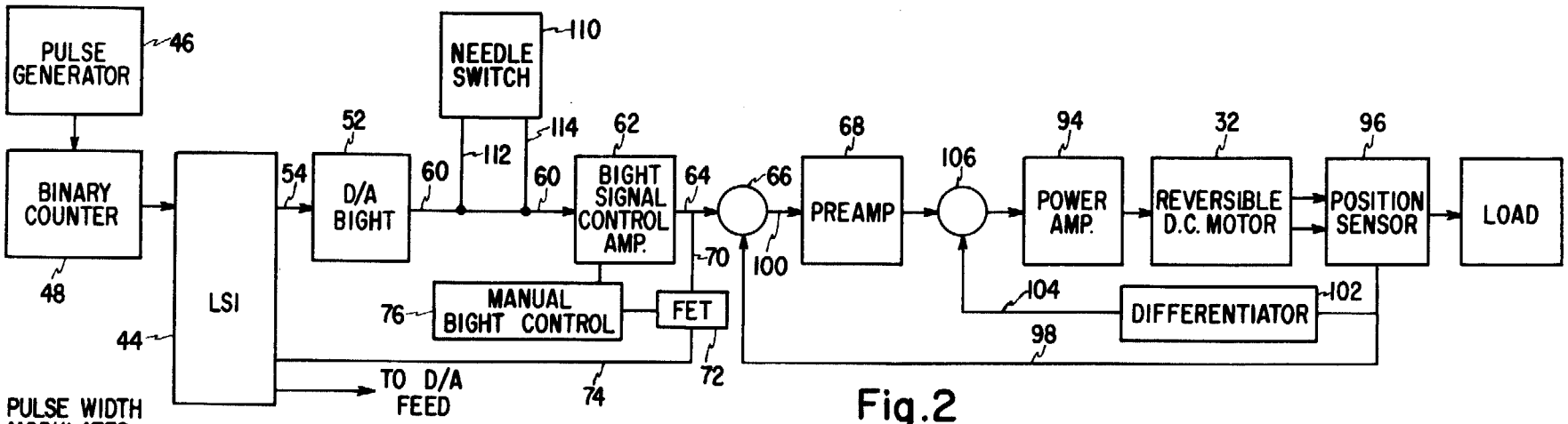
FIG. 2 is a general schematic block diagram for the bight control system of the invention.
FIG. 3 is a circuit diagram showing the bight control circuits of the invention.

Referring to FIG. 2, illustrated therein is a schematic block diagram for the bight control portion of the sewing machine. The feed control portion is not illustrated and is essentially the same as the bight control circuitry and reference to the bight control circuitry illustrated in FIG. 2 will be sufficient for purposes of understanding either of the aforementioned control circuits. For a more detailed description of the feed control circuit reference may be made to the aforementioned U.S. patent application Ser. No. 596,683. As previously mentioned, pattern information may be stored in a memory device which in the present invention is incorporated in a MOSFET Large Scale Integration (LSI) integrated circuit designated at 44 in FIG. 2. One method of extracting the information from the LSI 44 for presenting the same to the digital-to-analog converter for bight and feed control is disclosed in U.S. Pat. No. 3,855,956, assigned to the same assignee of the present invention. As disclosed therein digital information related to the positional coordinates for each stitch of a predetermined stitch pattern is stored in a static memory such as included in LSI 44. A pulse generator 46 (see also FIG. 1) is driven in timed relation with the sewing machine and produces a timing signal pulse between each successive stitch. The signal pulses are counted in a binary counter 48 to provide a timed series of progressively increasing binary numbers corresponding to the progressively increasing number of stitches in the pattern. The output of the counter is applied as the address to the memory to recover as output therefrom the digital information related to the positional coordinates for each stitch of the predetermined pattern. The memory output is applied to control driving devices operatively connected to impart a control range of movement to the needle and the feed of the sewing machine to produce a specific predetermined position coordinate for the needle penetration during each stitch formation.

As further illustrated in FIG. 2, the pulses from the pulse generator 46 are counted by binary counter 48 and presented at address input to the LSI 44. The LSI is illustrated in FIG. 1 as being mounted on a logic printed circuit board 50. The output of the LSI 44 is presented as output digital information related to the positional coordinates for each stitch in pulse width modulated form to digital-to-analog converter 52 for the bight. The LSI 44 may also include a latch whereby the bight information may be held for timed release to the bight servo system at a time appropriate to the operation of the needle jogging mechanism in the stitching operation. Proper timing for the release of the bight information may be determined by the pulse generator 46.

The pulse width modulated signal presented along line 54 to the digital-to-analog converter 52 is filtered, offset by rheostat 56 (FIG. 3) and scaled by a voltage divider 58 in the converter in order to accommodate a specific LSI 44 to those components between the LSI and the load to account for manufacturing variability. Analog signals from the digital-to-analog converter 52 have an output on line 60 to a bight signal control amplifier 62 which outputs on line 64 to the summing point 66 of a low level preamplifier 68 of a servo amplifier system. Further reference to the servo amplifier system may be found in the aforementioned U.S. patent application Ser. No. 431,649.

The output from the bight signal control amplifier 62 is also connected by way of line 70 to FET 72 of the enhancement type, having its gate connected by gate line 74 to the LSI 44. On suitable command the LSI 44 will apply a gate voltage through a latch circuit to FET 72 by way of gate line 74 thereby to place and retain FET 72 in the conductive or ON condition. A feedback signal then passes through line 70 and FET 72 to a wiper of a rheostat 78 supported on control block 76 (see FIGS. 1 and 3).

Thus, the gain of the bight signal control amplifier 62 may be controlled during pattern stitching or straight stitching through manual adjustment of the manual bight control rheostat 78. The manual bight control rheostat 78 which as seen in FIG. 1 is adjusted by a knob 80 and is mounted on power supply and override printed circuit board 82. Energization of the circuitry to LSI 44 for applying a gate voltage to FET 72 may be accomplished by a proximity switch associated with knob 80 and may be of the type described in co-pending U.S. patent application Ser. No. 596,685, filed on July 16, 1975, entitled "Digital Differential Compacitance Proximity Switch" which is assigned to the same assignee as the present invention. Rotation of knob 80 rotates wiper 84 of rheostat 78 for adjustment of the bight control signal. Further details of the override arrangement may be had by referring to the aforementioned co-pending application Ser. No. 596,683, filed July 16, 1975. As also mentioned in the co-pending application just referred to, override controls may also be provided for the feed signals and to the balance of the feed and may be represented in the present application by knobs 86 and 88 which respectively control balance and feed through suitable rheostats and circuitry similar to that described in relation to the bight control circuits above. For purposes of the present invention it need only be understood that override circuit means may be provided for modifying the bight control signal after its amplification by bight signal control amplifier 62.

As further illustrated in FIG. 3, the bight signal control amplifier 62 is indicated as an operational amplifier with rheostat 78 providing the feedback to the input. A MOSFET module 90, such as RCA type CD 4016A, comprises a plurality of dependent bilateral signal switches one of which is switch 72. The module may also be mounted on a printed circuit board 82 (see FIG. 1). As shown in the schematic of FIG. 3 a voltage signal from LSI 44 on line 74 will place FET 72 in an ON condition, inserting the wiper 84 of rheostat 78 in bypass arrangement in the feedback circuit. Feedback resistance of the operational amplifier 62 may thereby be reduced to decrease the gain of the operational amplifier and reduce the analog signal to the summing point 66 of the low level preamplifier 68 of the servo amplifier system mounted on servo circuit board 92. Preamplifier 68 drives a power amplifier 94 which supplies direct current of reversible polarity to the electromechanical actuator 32, which in the broadest sense comprises a reversible motor, to position the actuator in accordance with the input analog voltage on line 64. A feedback position senser 96 mechanically connected to the reversible motor 32 provides a feedback position signal on line 98 indicative of the existing output position. The input analog voltage and the feedback signal are algebraically summed at the summing point 66 to supply an error signal on line 100. The feedback signal from the position sensor is also differentiated with respect to time in a differentiator 102 and the resulting rate signal is presented on line 104 to the summing point 106 of the power amplifier 94 to modify the positional signal at that point. The position sensor 96 may be any device that generates an analog voltage proportional to position and may be a simple linear potentiometer connected to a stable reference voltage and functioning as a voltage divider. The differentiator 102 is preferably an operational amplifier connected to produce an output signal equal to the time rate of change of the input voltage.

While the reversible motor 32 may be a conventional low-inertia rotary d.c. motor, it is preferable, for purposes of the present invention that it takes the form of a linear actuator in which a lightweight coil moves linearly in a constant flux field and is directly coupled to the load to be positioned. This simplifies the driving mechanical linkage and minimizes the load inertia of the system. A suitable power supply circuit (not shown) may be connected to the AC house mains via a transformer for supplying 12 volt 60 hertz to the power supply. The supply, reduced to 12 volts a.c. undergoes full wave rectification, and filtration to provide ± 15 VDC to the power amplifiers and also to provide, through voltage regulators of a suitable type, ± 7.5 VDC in the bight position potentiometer 96 as well as ± 7.5 VDC to the digital-to-analog offset voltage dividers in the digital-to-analog converter 52. Although not shown, the power supply also provides ± 7.5 VDC to LSI 44. As the power supply itself forms no part of the present invention, reference may be made to co-pending application Ser. No. 596,683 mentioned above for a more detailed description of the type power supply which may be used with the present invention. Also, reference may be made to the same co-pending application for a more detailed description of the construction and operation of the LSI itself.

When sewing ornamental patterns, such as in embroidery stitching or the like, wherein more than one color thread is desired, or in cases wherein parallel lines of ornamental stitches are desired, it is necessary to substitute a multiple needle holder for the single needle generally used with the machine. It will be readily apparent that when more than one needle is held in the needle bar, if the same swing amplitude or bight is used for zig-zag stitching as was in the case of a single needle, one or both of the needles in the case of using two such needles may not align itself with the needle plate aperture 36 during penetration of the fabric. Means must therefore be provided to insure that the swing amplitude or bight of the needles does not exceed the width of the needle plate aperture. In accordance with the present invention additional circuit means are provided for modifying the electronic pattern control signal for the bight so that when the machine is in a multiple needle mode the maximum bight will be automatically reduced in proportion to the number of needles carried by the needle bar.

Referring to FIGS. 1, 2 and 3, a switch 110 is carried by control panel 76 and has its contacts in parallel through lines 112 and 114 with the output line 60 of the digital-to-analog converter 52. *Preferably, the circuit is arranged such that when the switch 110 is open, the bight will be reduced for multiple needle sewing, and when the switch 110 is closed, a wider bight will be available for single needle sewing.* It will be recalled, as discussed above, the digital-to-analog converter 52 puts out an analog signal which is converted from the digital information from the memory to provide a control signal for the bight in accordance with a selected pattern. In order to reduce the signal from the digital-to-analog converter 52, a fixed resistance in the form of a resistor 116 is placed in line 114 which resistor 116 has a resistance selected so that it will reduce the analog voltage from the digital-to-analog converter in an amount proportion to the number of needles, which in the case of switch 110 and its associated circuit in the preferred embodiment illustrated is selected for twin or two needle sewing. Thus, for example, the resistance of resistor 116 may be such to [reduce] *influence* the output from the digital-to-analog converter by an amount of 50%. It will be further seen that the parallel circuit containing switch 110 and resistor 116 is inserted into the circuitry prior to the application of any override or feedback signals, as would appear on line 70 subsequent to amplification of the bight control signal through bight signal control amplifier 62. Therefore, [when the switch 110 is closed to insert the resistance 116 into the circuit] any modification of the signal thereafter as through the override controls or the feedback [would only] *could not* have an effect on [a reduced] *the maximum* value *of the* control signal. By this means any modification of the bight control signal would not give rise to any concern that the swing amplitude of the needles would exceed the width of the needle plate aperture 36. It will also be understood, that instead of a single position switch 110 a multiple position switch may be provided wherein multiples of resistance may be inserted into the circuit in the same manner as the resistor 116 for situations wherein more than two needles will be used in the needle bar.

It will be seen from the above description that a novel and improved bight stop control mechanism is provided for a sewing machine for limiting the swing amplitude of a needle bar during zig-zag stitching when more than one needle is present in the needle bar. In particular, means are provided for modifying electronic bight control signals when the sewing machine is placed in a multiple needle mode to limit the swing amplitude of the needle bar so as to prevent any damage to the needles or the work or other elements of the sewing machine. While the invention has been described in its preferred embodiments, it will be obvious to one skilled in the art that various changes and modifications may be made therein without departing from the spirit and scope of the appended claims.

Having thus described the nature of the invention, what we claim herein is:

1. In a sewing machine having endwise reciprocable needle means, jogging means for initiating relative lateral movement of said needle means, electric motor means connected to said jogging means such that initiation of the relative lateral movement of said needle means is controlled in accordance with movement of said electric motor means, means including first circuit means for generating electrical input signals in accordance with predetermined stitches in a selected pattern and for connecting said electrical input signals to said electric motor means, said electric motor means having a work output proportional to said electric input signals, and circuit means in addition to said first circuit means and including switch means for limiting the magnitude of the electrical input signals to said electric motor means, said circuit means being operative for reducing said electrical input signals a fixed percentage each time said switch is actuated whereby upon actuation of said switch means the maximum extent of lateral movement of said needle means will be limited.

2. In a sewing machine as recited in claim 1 further comprising override control means for selectively varying the magnitude of said electrical input signals, and said circuit means being operative to reduce said electrical input signals a fixed percentage irrespective of the selection of said override control means.

3. In a sewing machine as recited in claim 2 wherein said circuit means is operative for reducing said electrical input signals prior to any variation of said electrical input signals by said override control means.

4. In a sewing machine as recited in claim 1 wherein said electrical motor means comprises a reversible electric motor, said reversible electric motor being responsive to said electrical input signals for initiating relative lateral movement of said jogging means in first and second directions.

5. In a sewing machine as recited in claim 4 wherein said reversible electric motor comprises a linear motor.

6. In a sewing machine having a needle bar disposed for endwise reciprocation, said needle bar being adapted for supporting one or more needles for reciprocation therewith, jogging means responsive to electrical input signals for initiating lateral movement of said needle bar to produce patterned stitches with the magnitude of lateral movement of said needle bar being proportional to the magnitude of the electric input signals, pattern control means including first circuit means operative for supplying electrical input signals of predetermined magnitude to said jogging means, and circuit means in addition to said first circuit means and including switch means operatively connected to said pattern control means, said switch means being adapted for operation when more than one needle is supported by said needle bar for reducing the predetermined magnitude of the electrical input signals a fixed percentage of its original value supplied by said pattern control means.

7. In a sewing machine as recited in claim 6 wherein said circuit means includes resistance means, the value of said resistance means being selected in accordance with the number of needles supported by said needle bar.

* * * * *